May 23, 1950        J. H. PLÁ        2,509,167
LOAD VEHICLE BED
Filed Jan. 28, 1949        2 Sheets-Sheet 1
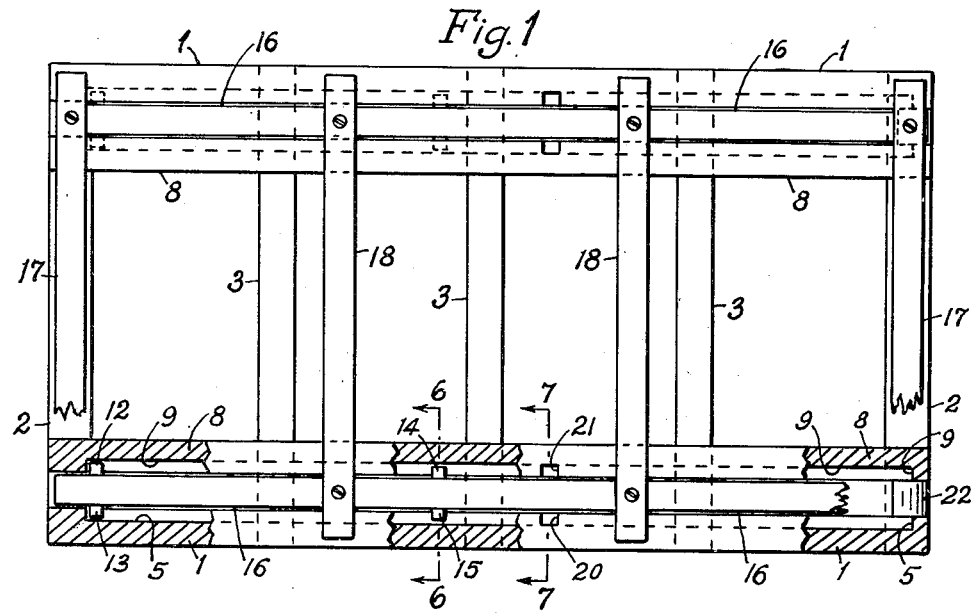
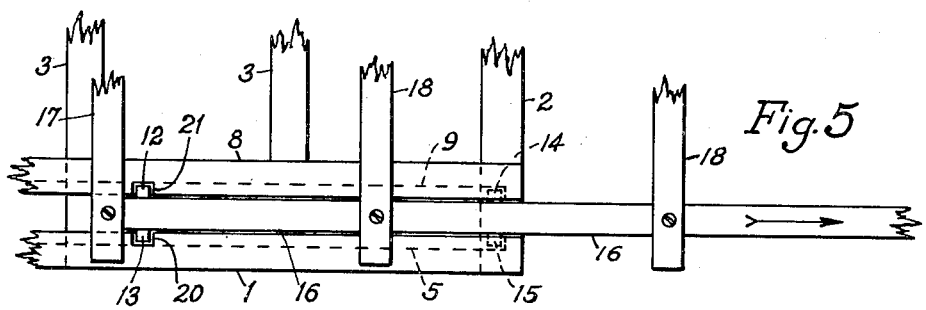
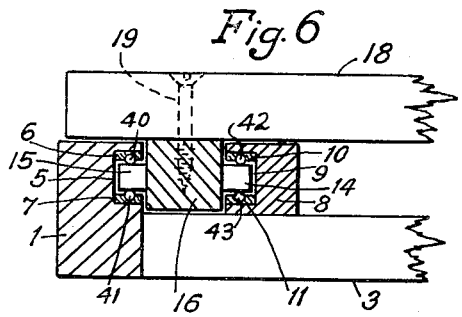
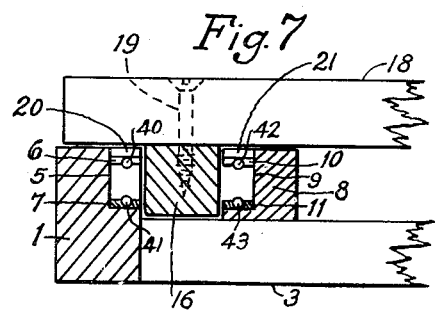
INVENTOR:
José Hernandez Plá
BY Singer, Ehlert, Stern & Carlberg
ATTORNEYS.

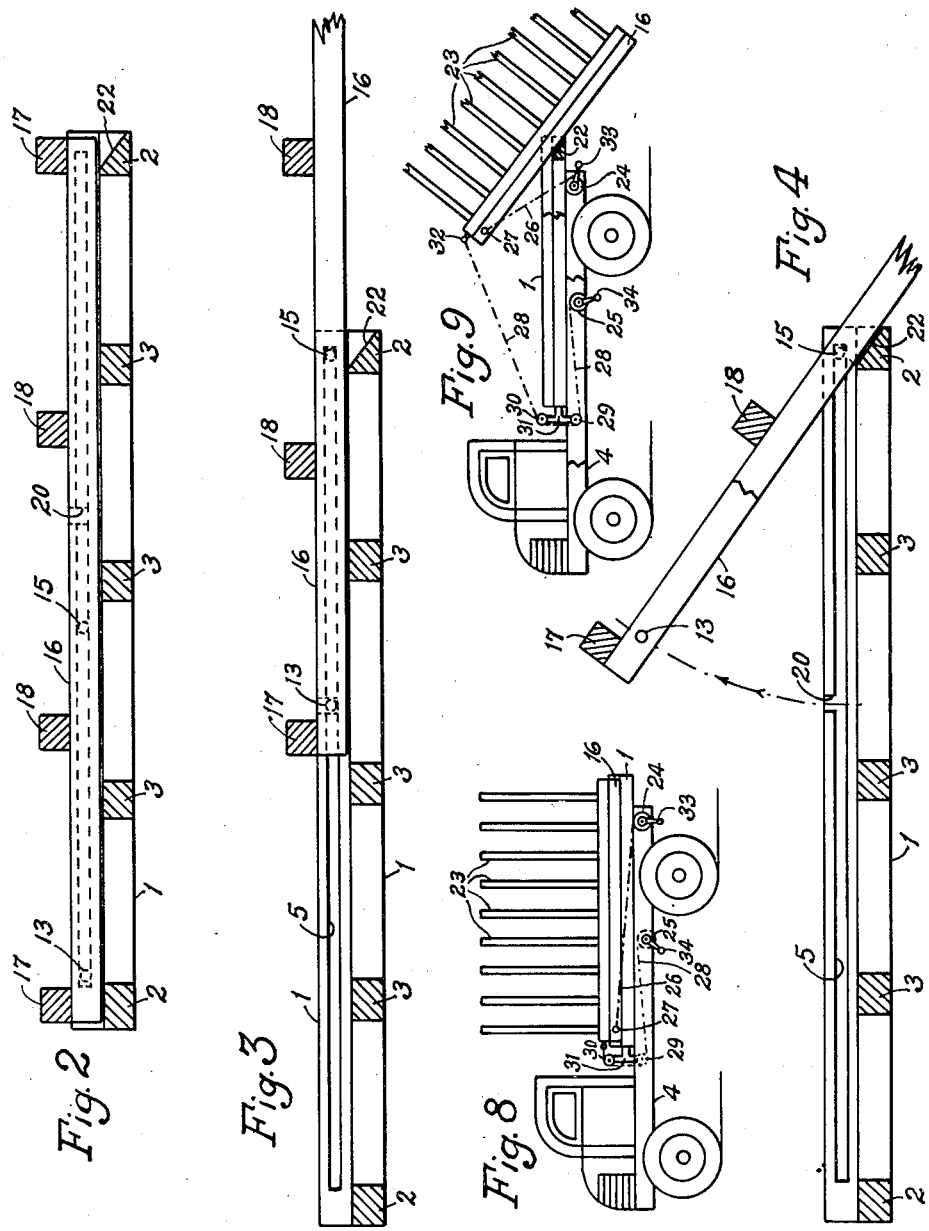

Patented May 23, 1950

2,509,167

UNITED STATES PATENT OFFICE 2,509,167

LOAD VEHICLE BED

José Hernandez Plá, Marianao, Cuba

Application January 28, 1949, Serial No. 73,302
In Cuba December 18, 1948

3 Claims. (Cl. 298—12)

This invention relates to load vehicles, particularly to vehicles for hauling sugar cane, such as for example ox-carts and motor trucks, though the invention may as well be adapted to vehicles for carrying other materials such as for example construction materials, etc.

The object of this invention is to provide a vehicle bed having a sliding and backward dumping platform on which the load is charged, so that the load can be discharged at the delivery place with the least stress and the discharged load will not interfere with the vehicle wheels. Such performance is attained by providing the sliding platform with bolsters slidably mounted between channeled guide rails including antifriction members at the vehicle bed to facilitate the slidable movement of the platform, and the platform bolsters having stop members serving to define the resting and dumping positions of the platform, one of the stop members also serving as a pivot shaft for the dumping motion of the platform; whereupon the loaded platform will be safely supported and will not give rise to accidents due to the release of the load, thus a strong, inexpensive, and quick operating structure being provided.

The invention is described with reference to the figures of the accompanying drawings, of which:

Fig. 1 is a top plan view, partly broken away, of a load-vehicle bed embodying the sliding and dumping platform of this invention.

Fig. 2 is a longitudinal vertical section view of the bed and platform in the normal resting position of the latter.

Fig. 3 is a section view similar to that of Fig. 2, showing the platform in the position preliminary to the dumping motion.

Fig. 4 is a section view similar to that of Fig. 2, in the dumping position of the platform.

Fig. 5 is a partial horizontal plan view of the bed and platform, showing the position of one of the platform bolsters in the position preliminary to the dumping motion.

Fig. 6 is a cross-section vertical section view on line 6—6 of Fig. 1.

Fig. 7 is a cross-section vertical section view on line 7—7 of Fig. 1.

Figs. 8 and 9 are side elevational views of a load truck, respectively showing the platform in is resting and dumping positions.

In the drawings, 1 indicates the side bolsters, 2 the heads and 3 the cross braces of a load-vehicle bed, such as for example the bed of a motor vehicle such as the truck illustrated in Figs. 8 and 9 of the drawings, wherein the bed is secured to the motor vehicle chassis 4.

For the purpose of this invention, the side bolsters 1 are twice as high as the heads 2 and cross braces 3, and each bolster 1 has at the upper half portion of the inner side face thereof a channeled recess 5 serving to lodge metal plates 6 and 7 having mounted thereon antifriction projecting balls 40 and 41, said plates being secured to the upper and lower faces of the recess 5. The heads 2 and cross braces 3 have secured thereon a guide rail 8 formed by a wooden member of square section positioned parallelly to the bolster 1 at a certain distance therefrom, said guide member 8 having a longitudinal recess 9 at its side face opposite the inner side face of the bolster 1, and the recess 9 being of the same height as the recess 5 of the latter and in transversal alignment with the same, the recess 9 having secured to its upper and lower faces metal plates 10 and 11 having mounted thereon antifriction projecting balls 42 and 43.

Between the plates 6 and 7 with antifriction projecting balls 40 and 41 of the side bolster 1 and the plates 10 and 11 with antifriction projecting balls 10 and 11 of the inner guide rail 8 are slidably mounted two pairs of journals 12 and 13, 14 and 15, the two journals of each pair being in transversal alignment and the journals of the two pairs respectively projecting from the fore end and an intermediate point of the opposed side faces of the side bolsters 16 of the sliding and dumping platform formed by the two bolsters 16, the heads 17 and the cross braces 18 which are secured by the head screws 19 upon the bolsters 16, and upon the heads 17 and cross braces 18 may be disposed a wooden or metal lining (not shown) to receive the load to be charged by the vehicle.

The normal resting position of the sliding and dumping platform is determined by the abutment of the journals 12 and 13 of each bolster 16 with the fore closed ends of the channeled recesses 5 of the boltsers 1 and the channeled recesses 9 of the guide rails 8, and the dumping preliminary position of the sliding and dumping platform is determined by recesses 20 and 21 formed in the top face of each side bolster 1 and each inner guide rail 8, which recesses are in transversal alignment to form a sort of slot situated beyond half the length of the bolsters 1 from the fore head 2, to receive and allow the journals 12 and 13 of the bolsters 16 of the sliding platform to rise out beyond the recesses 20 and 21 when the journals 14 and 15 of the bolsters 16 abut the rear closed ends of the channeled recesses 5 and 9 of the bolsters 1 and the guide rails 8 respectively, in which position the journals 14 and 15 may serve as a pivot shaft for the backward dumping movement of the platform, as shown in Fig. 4 of the drawings, along an angle of about 30°, in which position the platform will bear upon an inclined cut 22 formed in the rear head 2 of the vehicle stationary bed.

The sliding and backward dumping platform may be provided with lateral bands formed by poles 23 as shown in Figs. 8 and 9 when the load to be hauled is formed by long materials such as sugar canes, or the same may be provided with one-piece wooden or sheet-metal bands for hauling loose earth, stones, sand, or the like.

To facilitate the handling of the sliding and dumping platform, two wire-cable winding drums may be disposed in transversal horizontal position beneath the stationary bed of the vehicle, one drum, 24, being mounted on the rear end of the chassis 4 and another drum, 25, being mounted on the intermediate portion of the chassis 4, the former drum 24 serving to operate two cables 26 tied to hooks 27 at the fore ends of the outer side faces of the bolsters 16 of the sliding and dumping platform, and the latter drum serving to operate a cable 28 disposed on the longitudinal middle line of the chassis 4 and being upwardly guided by horizontal-shaft sheaves 29 and 30 mounted on a supporting piece 31 secured to the fore face of the fore head 2 of the stationary bed and tied to a hook 32 secured to the fore face of the fore head 17 of the sliding and dumping platform. The winding drums 24 and 25 of the cables 26 and 28 are provided with suitable racket mechanisms and are operated by handles 33 and 34. In this manner, to cause the sliding and dumping platform to move backwards, the drum 25 is released and the drum 24 is operated to wind the cables 26 until the journals 12 and 13 register the slot formed by the recesses 20 and 21 and the journals 14 and 15 abut the rear ends of recesses 5 and 9, in which position the platform can be tilted backwards about the journals 14 and 15 thereby pulling the cable 28 whose exposed length is regulated by means of drum 25. Once the load is dumped, the drum 25 is released and the drum 24 is operated to wind the cable 28 which will pull the fore end of the platform and cause it to move down until the journals 12 and 13 engage the slot formed by the recesses 20 and 21, in which position the drum 25 will be operated to wind the cables 26 which will pull the platform forward, whereupon the journals 12 and 13 will run between the antifriction plates 6—7, 10—11 of the bolsters 1 and the slide rails 8 of the stationary bed respectively, to the resting position determined by the abutment of journals 12 and 13 with the fore closed ends of the channeled recesses 5 of the bolsters 1 and the channeled recesses 9 of the slide rails 8.

It is obvious that changes may be made in the construction details of the sliding and dumping platform and the means to operate it, without thereby altering the essential character of the invention which is such as claimed hereinafter.

What I claim is:

1. A load-vehicle bed provided with a pair of inter-spaced longitudinal guide members, a platform slidably mounted on the bed by means of a longitudinal slidable bolster between the longitudinal guide members of the bed, the bolster of the platform including fore and intermediate stop members to determine the end forward and backward positions of the platform, and the guide members of the bed having transversal slots at an intermediate point thereof to give way upwards to the fore stop members of the platform when the intermediate stop members reach the rear end of the guide members of the bed, so that as the platform takes said position the same may be tilted backward, and means mounted on the vehicle frame to operate the platform backwardly and forwardly.

2. A vehicle bed provided with pairs of inter-spaced longitudinal guide members, a platform slidably mounted on the bed by means of a pair of longitudinally sliding bolsters between each two longitudinal guide members of the bed, the platform bolsters having pairs of transversal journals disposed in transversal alignment the two journals of each pair, one pair of journals being situated at the fore end of the platform bolsters and the other pair of journals being situated at an intermediate point of the platform bolsters, said journals serving to determine the forward and backward end positions of the platform and the rear journals serving at the rear end position as pivot shafts for the tilting of the platform, and the bed guide members having transversal slots at an intermediate point thereof to give way upwards to the fore journals of the platform at the same time that the intermediate journals thereof will reach the rear end of the members of the bed and serve as pivot shafts for the backward tilting of the platform, and means mounted on the vehicle to operate the platform forwardly and backwardly.

3. A vehicle bed provided with inter-spaced pairs of bolsters having channeled recesses at their inner opposed faces, antifriction members secured to the upper and lower faces of the channeled recesses of said bolsters, a platform slidably mounted on the bed by means of bolsters longitudinally slidable between each two bolsters of the bed, the bolsters of the platform having pairs of transversal journals and the two journals of each pair being in transversal alignment and disposed between the friction members of the bed bolsters, one pair of journals being situated at the fore end of the platform bolsters and the other pair of journals being situated at an intermediate point of the platform bolsters, said journals serving to determine the forward and backward end positions of the platform as the same abutt the respective closed ends of the channeled recesses of the bed bolsters, and in the end rear position the intermediate journals serving as pivot shafts for the backward tilting of the platform, the bed bolsters having transversal slots at an intermediate point thereof to give way upwards to the platform fore journals at the same time that the platform intermediate journals will reach the closed rear ends of the channeled recesses of the bed bolsters to serve as pivot shafts for the backward tilting of the platform, and cable winding means secured to the platform and mounted on the vehicle frame to operate the platform forwardly and backwardly.

JOSÉ HERNANDEZ PLÁ.

REFERENCES CITED

The following references are of record in the file of this patent:

UNITED STATES PATENTS

| Number | Name | Date |
|---|---|---|
| Re. 17,497 | Robinson | Nov. 19, 1929 |
| 1,051,340 | Madden | Jan. 21, 1913 |
| 1,555,694 | Murdock et al. | Sept. 29, 1925 |

FOREIGN PATENTS

| Number | Country | Date |
|---|---|---|
| 17,235 | Australia | of 1928 |